(12) United States Patent
Merton et al.

(10) Patent No.: US 7,647,261 B2
(45) Date of Patent: Jan. 12, 2010

(54) METHOD AND APPARATUS FOR RETIREMENT INCOME PLANNING

(75) Inventors: Robert Merton, Cambridge, MA (US); Roberto Mendoza, New York, NY (US); Peter Hancock, Rye, NY (US); Zvi Bodie, Boston, MA (US)

(73) Assignee: Integrated Finance Limited, New York, NY (US)

( * ) Notice: Subject to any disclaimer, the term of this patent is extended or adjusted under 35 U.S.C. 154(b) by 239 days.

(21) Appl. No.: 11/531,989

(22) Filed: Sep. 14, 2006

(65) Prior Publication Data

US 2007/0061238 A1    Mar. 15, 2007

Related U.S. Application Data

(60) Provisional application No. 60/717,478, filed on Sep. 15, 2005.

(51) Int. Cl.
G06Q 40/00        (2006.01)

(52) U.S. Cl. .......................................... 705/35; 705/37
(58) Field of Classification Search ...................... 705/1, 705/35, 37, 36, 4, 40, 38, 39; 706/45; 235/379, 235/330, 70; 707/6
See application file for complete search history.

(56) References Cited

U.S. PATENT DOCUMENTS

| | | | |
|---|---|---|---|
| 5,784,696 A | 7/1998 | Melnikoff | |
| 5,884,287 A | 3/1999 | Edesess | |
| 5,930,760 A | 7/1999 | Anderton et al. | |
| 5,987,433 A | 11/1999 | Crapo | |
| 6,012,043 A | 1/2000 | Albright et al. | |
| 6,253,192 B1 | 6/2001 | Corlett | |
| 8,424,952 | 7/2002 | Yinbal | |
| 6,611,807 B1 | 8/2003 | Bernheim | |
| 6,636,834 B1 | 10/2003 | Schirripa | |
| 2002/0103733 A1 | 8/2002 | Barrington et al. | |
| 2002/0138310 A1 | 9/2002 | Sagalow | |
| 2002/0188536 A1 | 12/2002 | Milosaljevic et al. | |
| 2002/0188540 A1 | 12/2002 | Fay et al. | |
| 2002/0194098 A1 | 12/2002 | Stiff et al. | |
| 2003/0004844 A1 | 1/2003 | Hueler | |
| 2003/0191672 A1* | 10/2003 | Kendall et al. | 705/4 |
| 2003/0233301 A1 | 12/2003 | Chen et al. | |
| 2004/0088236 A1 | 5/2004 | Manning | |
| 2004/0177022 A1 | 9/2004 | Williams et al. | |
| 2005/0060251 A1* | 3/2005 | Schwartz et al. | 705/35 |
| 2005/0144108 A1 | 6/2005 | Loeper | |
| 2005/0197866 A1 | 9/2005 | Salcedo et al. | |

OTHER PUBLICATIONS

"Pension Funds and Financial Innovation" Zvi Bodia—National Bureau of Economic Research, Sep. 1989.*
International Search Report and Written Opinion for PCT/US0636025; copy consists of 6 unnumbered pages.

* cited by examiner

*Primary Examiner*—Mary Cheung
*Assistant Examiner*—John H Holly

(57) ABSTRACT

Embodiments of the invention generally provide a method and apparatus for retirement income planning. One embodiment of a method for planning an income stream includes receiving personal data relating to an individual, where the personal data includes the value of the individual's projected income and the value of the individual's projected expenses. The difference between the projected expenses and the projected income is then calculated, and an annuity is purchased in substantially real time from among a plurality of annuities presented in an auction-style format, where the annuity provides a sum to offset the calculated difference.

31 Claims, 8 Drawing Sheets

600

Sample Solution    You are logged in as lexas | log out
◀ Back | Next ▶

Introduction >   Your Information >   Chart Your Info >   Shortfall Analysis >   Sample Solution >

Read through the recommendation below. if you like, you can go back to change the information you entered earlier in the planning process. If you're happy with the sample solution, click Next to receive quotes.

Summary

Congratulations. Based on the information you gave us, we were able to design a Smart Pension sample solution that fulfills your lifetime income requirements during retirement - including estimated taxes. This solution will provide you with a guaranteed monthly paycheck for the rest of your life.

| | |
|---|---|
| Total lifetime income shortfall | $541,658 |
| Sample solution lifetime payout | $577,996 |
| Sample solution estimated cost | $331,136 |
| Qualified assets available to fund this shortfall | $625,000 |
| Surplus qualified assets after funding shortfall | $293,864 |

602 — [bar chart of Monthly Income vs Year 2006–2039, with legend: Gap, Income Taxes, Sample solution]

Details

| Investment Product | Total |
|---|---|
| Expected Lifetime Payout to age 85* | $577,996 |
| Lifetime Payout to age 90 | $693,595 (est) |
| Lifetime Payout to age 95 | $809,194 (est) |

Provider Quotes
PROVIDER A
Ratings (S&P: AA, A.M. Best: A++, Moody's: Aaa)

| Lifetime Income | 0% Annual Increase | 3% Annual Increase | 5% Annual Increase | Quoted Premium |
|---|---|---|---|---|
| Life With Installment Refund | ○ $120,664 | ○ $169,143 | ○ $219,323 | |
| Joint & Survivor with Installment Refund 50% survivor benefit | ○ $128,841 | ⊙ $185,061 | ○ $244,691 | $185,061 |
| Joint & survivor with installment refund 100% survivor benefit | ○ $136,292 | ○ $199,549 | ○ $267,790 | |
| Term Income | | | | |
| Certain Only for 15 years | | ☑ $130,404 | | $130,404 |
| Total Quoted Premium | | | | $315,465 |

PROVIDER B
Ratings (S&P: AA+, A.M. Best: A++, Moody's: Aa3)

Note: Life Only and Joint & Survivor annuities from John Hancock Life provide a benefit similar to an Installment Refund by quoting Certain and Life annuities that have a Certain period which guarantees a retain of principal. Please contact us (see below) if you want exploit Installment Refund quotes

| Lifetime Income | 0% Annual Increase | 3% Annual Increase | 5% Annual Increase | Quoted Premium |
|---|---|---|---|---|
| Life With Installment Refund | ○ $130,370 | ○ $103,321 | ○ $230,732 | |
| Joint & Survivor with Installment Refund 50% survivor benefit | Contact Us | Contact Us | Contact Us | $0 |
| Joint & survivor with installment refund 100% survivor benefit | Contact Us | Contact Us | Contact Us | |
| Term Income | | | | |
| Fixed Period for 15 years | | ☑ $139,507 | | $139,507 |
| Total Quoted Premium | | | | $139,507 |

PROVIDER C
Ratings (S&P: AA-, A.M. Best: A, Moody's: Aa3)

FIG. 7

METHOD AND APPARATUS FOR RETIREMENT INCOME PLANNING

CROSS REFERENCE TO RELATED APPLICATIONS

This application claims the benefit of U.S. Provisional Patent Application Ser. No. 60/717,478, filed Sep. 15, 2005, which is herein incorporated by reference in its entirety.

FIELD OF THE INVENTION

The present invention generally relates to retirement planning, and more particularly relates to planning an income stream to fund a desired standard of living during retirement.

BACKGROUND OF THE INVENTION

Most working individuals have retirement plans in place to support themselves financially when they retire from the workforce. Such plans generally manage and/or invest the employee's assets (sometimes including at least a portion of the employee's regular income) in order to provide financial security when the employee retires and no longer receives a regular income.

Recently, many retirement plans have shifted from defined-benefit type plans, in which a plan sponsor controls investment risk and portfolio management to minimize investment risk, to defined-contribution type plans, which give the individual more control and discretion in the investment of funds but come with increased investment risk. Unfortunately, typical defined contribution type plans often fail to provide the individual with the resources and knowledge necessary to make informed investment decisions.

Many individuals can easily visualize their desired standard of living upon retirement, but are unsure of the necessary steps to take in order to secure this desired standard. Moreover, many individuals find available investment products, such as investment contracts and annuities, complicated and intimidating, making retirement planning a daunting task.

Therefore, there is a need in the art for a method and apparatus for retirement income planning.

SUMMARY OF THE INVENTION

Embodiments of the invention generally provide a method and apparatus for retirement income planning. One embodiment of a method for planning an income stream includes receiving personal data relating to an individual, where the personal data includes the value of the individual's projected income and the value of the individual's projected expenses. The difference between the projected expenses and the projected income is then calculated, and an annuity is purchased in substantially real time from among a plurality of annuities presented in an auction-style format, where the annuity provides a sum to offset the calculated difference.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 6 illustrates an exemplary display that communicates the optimal solution to the user;

FIG. 7 illustrates an exemplary display that communicates the alternative solutions to the user.

To facilitate understanding, identical reference numerals have been used, where possible, to designate identical elements that are common to the figures.

DETAILED DESCRIPTION

Embodiments of the invention generally provide a method and apparatus for retirement income planning (e.g., for use in defined benefit and/or defined contribution plans). In particular, the present invention integrates a plurality of financial drivers in order to assist an individual in managing his or her assets and targeted needs (e.g., income, savings, home, medical, etc.) to ensure a desired standard of living, both while working and while retired. In one embodiment, assets and risks are managed in a manner that provides an income stream upon retirement, the income stream providing the financial means to support the desired standard of living.

In short, the present invention assists a user in determining the minimum standard of living he or she is willing to tolerate in retirement, estimating the cost of that minimum standard of living (factoring in a long lifetime and inflation), estimating future income (e.g., from Social Security, pensions, part-time work and other sources), and ensuring that the minimum standard of living will always be achieved (afforded) by purchasing an annuity to fill the gap between the estimated future income and the estimated expenses associated with the minimum standard of living.

Figure 1:
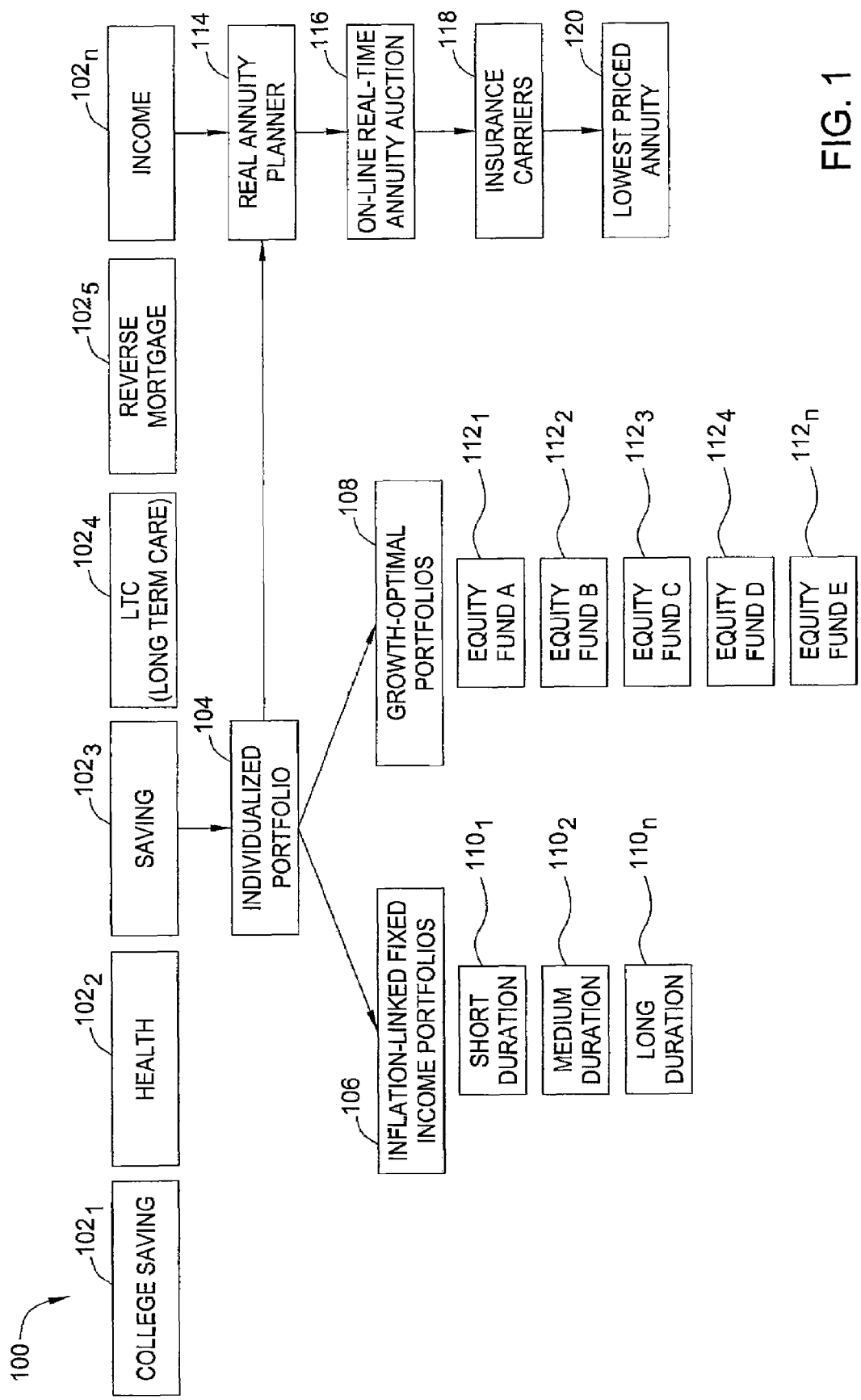
FIG. 1 is a block diagram illustrating one embodiment of a system for planning retirement income, according to the present invention.

FIG. 1 is a block diagram illustrating one embodiment of a system 100 for planning retirement income, according to the present invention. In one embodiment, the system 100 is implemented in an Internet-based platform. The system 100 comprises a plurality of financial drivers $102_1$-$102_n$ (hereinafter collectively referred to as "drivers 102"), each driver 102 configured to represent and manage a targeted need. The drivers 102 are integrated such that they may share information among themselves in order to present a complete picture of an individual's financial situation. Each of the drivers 102 may be further associated with one or more educational tools (e.g., hyperlinks to frequently asked questions, informational articles, etc., not shown) to assist a user in making informed decisions as they relate to the user's goals and the functionalities of the particular driver 102.

In one embodiment, the drivers 102 include one or more of the following: a college savings driver $102_1$ (e.g., for financing higher education needs), a health or medical needs driver $102_2$ (e.g., for bridging an employer-provided health plan and Medicare/Medicaid), a savings driver $102_3$ (e.g., for managing savings to meet retirement predefined goals), a long term care driver $102_4$ (e.g., for funding long-term medical treatment), a reverse mortgage driver $102_5$ (e.g., for deriving equity from an owned home) and a pension driver $102_n$ (e.g., for funding an income stream for retirement).

In one embodiment, the college savings driver $102_1$ is configured to finance higher education needs (e.g., tuition, books, room and board, etc.).

In one embodiment, the health needs driver $102_2$ is configured for financing health-related costs that are not covered by an existing health care plan, e.g., in the period between the expiration of an employer-provided health care plan and availability of a government-provided health care plan, such as Medicare or Medicaid.

In one embodiment, the savings driver $102_3$ is configured for managing the individual's "accumulation phase" of retirement planning, where the accumulation phase is substantially equivalent to the individual's working years (e.g., where assets are accumulated). The accumulation phase is managed such that the individual's savings meet targeted retirement goals. That is, assets are accumulated (e.g., by allocating funds among investments during the individual's working years) in a manner to generate sufficient funds to finance a desired standard of living at the time of retirement (e.g., financed by an annuity to be purchased at least in part with a lump sum, as described in further detail below)

The savings driver $102_3$ further comprises an individualized portfolio 104 reflecting investments of the individual's retirement savings. The individualized portfolio 104 is further divided into a fixed income portfolio 106 and a growth-optimal portfolio 108.

In one embodiment, the fixed income portfolio 106 comprises a plurality of inflation-linked fixed income portfolios $110_1$-$110_n$ (hereinafter collectively referred to as "fixed income portfolios 110"). For example, the fixed income portfolio 106 may comprise a short-duration fixed income portfolio $110_1$, a medium-duration fixed income portfolio $110_2$ and a long-duration fixed income portfolio $110_n$. The goal of each fixed income portfolio 110 is to invest the individual's resources in a manner to deliver a sum of money sufficient to purchase an annuity that will provide a minimum retirement income (e.g., X number of dollars per year). Each of the fixed income portfolios 110 comprises inflation-linked bonds combined with nominal government bonds and inflation derivatives or other appropriate investment vehicles. The duration and the convexity of a particular fixed income portfolio 110 hedge the real interest rate exposure. In further embodiments, the fixed income portfolio 106 comprises a synthetic deferred real annuity.

In one embodiment, the growth-optimal portfolio 108 comprises a dynamically managed set of funds in different asset classes, for example, in a plurality of diversified global equity portfolios $112_1$-$112_n$ (hereinafter collectively referred to as "global equity portfolios 112"). The managed set of funds can be created using actual index funds or using derivatives, and the choice of index can also be based on cost. Each global equity portfolio 112 comprises a combination of global equity, fixed income and other assets. For example, the global equity portfolios 112 may include one or more of a growth-optimal commodity fund, a growth-optimal corporate bond fund, a growth-optimal developed fund, a growth-optimal emerging market funds and a growth-optimal real estate fund. In one embodiment, the managed set of funds can grow or diminish over time as the user wants more or less funds managed in the growth portfolio 108.

The savings driver $102_3$ is configured to allocate the individual's retirement savings among the portfolios 104, 106, 108, 110 and 112, based upon age and upon a stated risk preference, where the magnitude of the stated risk preference relates, inversely, to the value of the minimum desired standard of living (e.g., the lower the minimum, the greater the risk that is taken in managing the portfolio).

In one embodiment, the long term care driver $102_4$ is configured for funding long-term medical treatment that is not covered by an existing health care plan.

In one embodiment, the reverse mortgage driver $102_5$ is configured for deriving equity from an owned home, e.g., by taking out a loan against the home that does not need to be paid back for as long as the individual resides in the home. The loan amount may be used, for example, to fund some of the other financial drivers 102 (e.g., to purchase long-term care, Medicare riders, annuities, etc.).

In one embodiment, the pension driver $102_n$ is configured for managing the individual's "payout phase" of retirement planning, e.g., by constructing and funding an income stream for retirement. In particular, the pension driver $102_n$ assists an individual in measuring his or her needs and in planning out a reliable post-retirement income stream to meet those needs. For example, the pension driver $102_n$ may purchase an annuity using assets accumulated during the accumulation phase, where the annuity provides a defined benefit level or sum of money during each year of the individual's retirement. Alternatively, the pension driver $102_n$ may purchase annuities using funds provided by a reverse mortgage or other qualified fund sources (e.g., personal savings, individual retirement accounts, etc.).

To this end, the pension driver $102_n$ comprises a real annuity planner 114 that assists the individual in determining the size of and in purchasing an annuity to fund the post-retirement income stream. One embodiment of the real annuity planner 114 is discussed in further detail below with respect to FIG. 2. As discussed, the real annuity planner 114 is linked to an on-line, real-time annuity auction 116 that enables the individual to compare the prices of similar institutionally priced annuities provided by a plurality of insurance carriers 118. Typically, the real annuity planner 114 will assist the individual in identifying and purchasing the lowest priced annuity 120 that meets his or her needs, as determined by the real annuity planner 114. In one embodiment, the real annuity planner 114 examines both real and nominal variable annuities (including, for example, equity-indexed, inflation-linked annuities). As described in further detail below, the real annuity planner 114 may be a stand-alone module as well as a module that is linked directly to the pension driver $102_3$.

Figure 2:
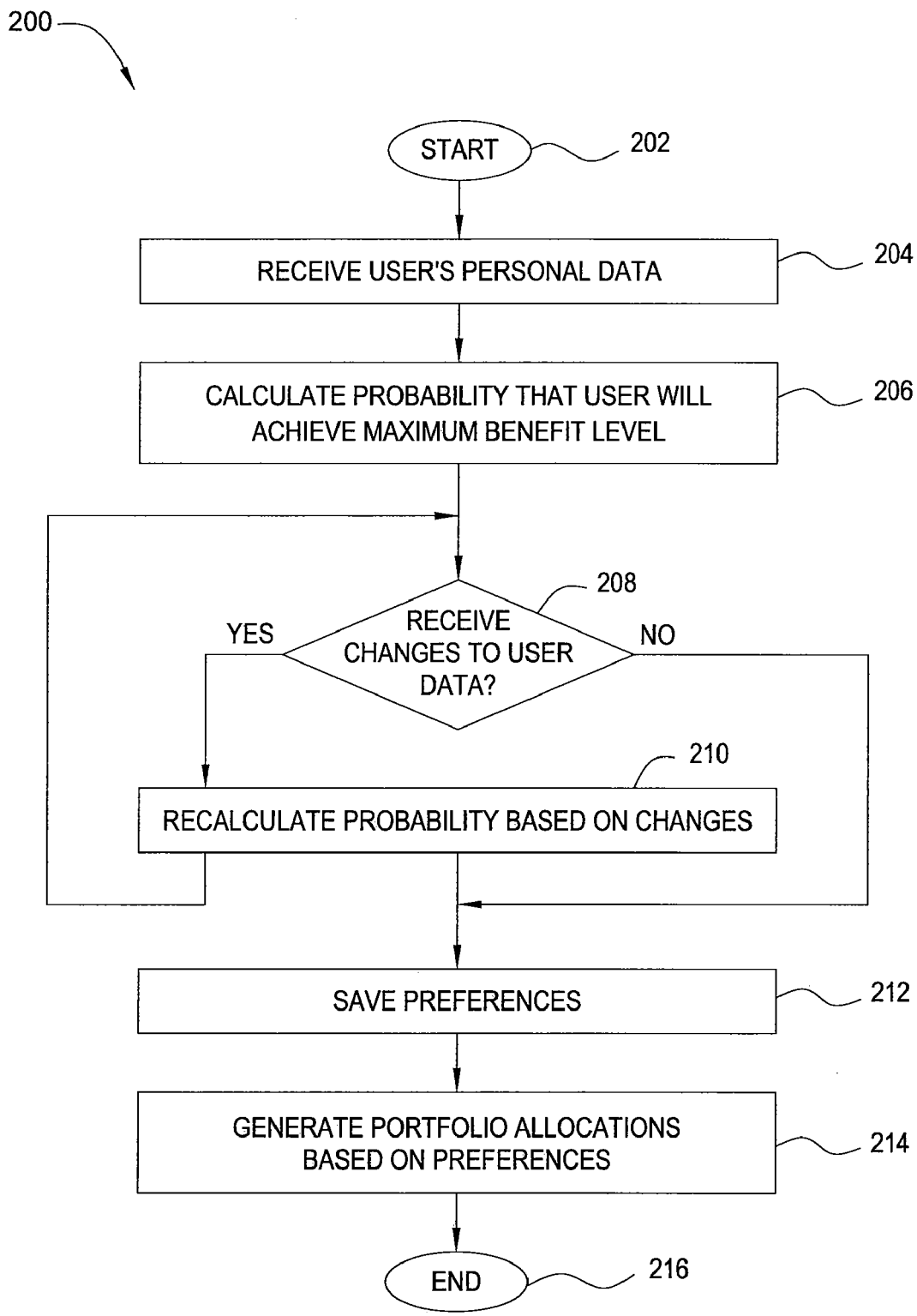
FIG. 2 is a flow diagram illustrating one embodiment of a method for determining an appropriate level of risk to take in an integrated pension portfolio, according to the present invention.

FIG. 2 is a flow diagram illustrating one embodiment of a method 200 for determining an appropriate level of risk to take in an integrated pension portfolio, according to the present invention. The method 200 may be implemented, for example, in the savings driver $102_3$ discussed above with respect to FIG. 1.

The method 200 is initialized at step 202 and proceeds to step 204, where the method 200 receives a user's personal data. In one embodiment, the user him/herself provides the personal data. In another embodiment, the personal data is provided by the user's employer (e.g., via a retirement plan administration system and/or a payroll system feed). Where the user's employer provides the user data, a messaging arrangement may be implemented to facilitate the exchange of information. In one embodiment, the personal data includes information that the user is expected to know off the top of his or her head, such as current salary, age, marital status, home ownership, savings rate, projected retirement age, a voluntary contribution level or amount, a minimum retirement income (e.g., the minimum percentage or amount of retirement income that the user requires) and desired retirement income (e.g., a target percentage or amount of retirement income that the user desires). In one embodiment, default values may be provided for some of this personal data (e.g., retirement age, savings rate, minimum/desired retirement income, etc.). In one embodiment, where the user's retirement plan is a defined benefit plan, the personal data includes the plan rules, so that the method 200 can determine how much income will come from the defined benefit plan. In one embodiment, the minimum retirement income can be derived through the use of a planner that calculates the shortfall, or difference, between the user's expected income and the user's expected expenses to establish a minimum retirement income, as described in further detail with respect to FIG. 5.

In step 206, the method 200 calculates the probability the user will achieve his or her desired retirement income, based on the personal data provided in step 204 (including whether the user has a defined benefit plan, and, if so, how much he or she will receive from such plan), and communicates the calculated probability to the user.

Figure 3:
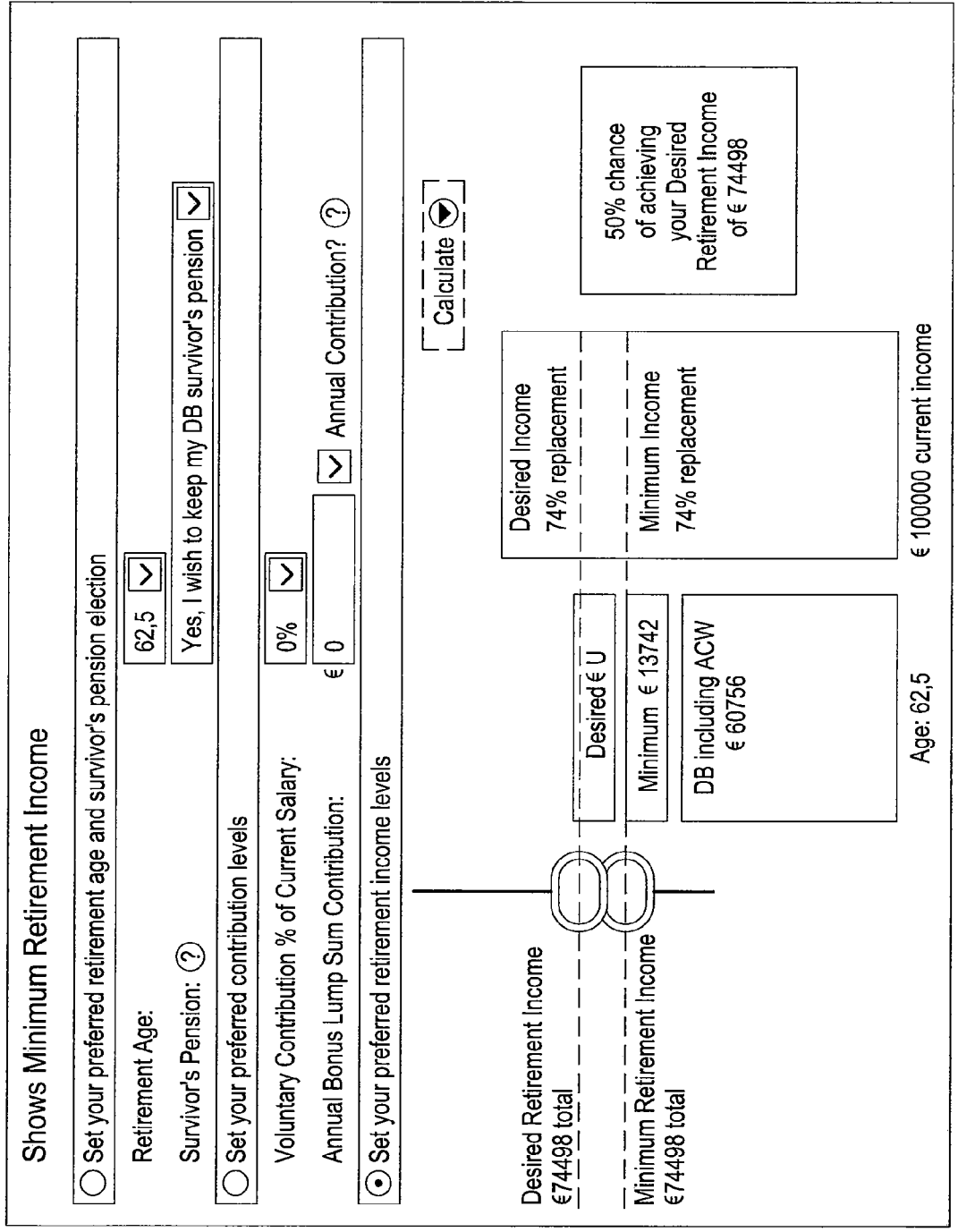
FIG. 3 illustrates an exemplary display that communicates the probability of achieving the desired retirement income to the user.

FIG. 3 illustrates an exemplary display 300 that communicates the probability of achieving the desired retirement income to the user. As illustrated, the display 300 may graphically illustrate the smallest payout on which the user can live, or the user's minimum retirement income (or risk level, e.g., €13742), the user's desired retirement income (e.g., €74498), the user's target retirement age (e.g., 62.5 years), the user's voluntary contribution (e.g., as a percentage of current salary), whether the user wishes to keep a survivor's pension and the probability of achieving the desired retirement income (e.g., 50%). In one embodiment, the minimum and desired retirement incomes may additionally be expressed as percentages of the user's current salary (e.g., to replace x percent of the current salary). In one embodiment, the minimum and desired retirement incomes can be updated intermittently or on a regular basis (e.g., once a month).

Referring back to FIG. 2, in step 208, the method 200 determines whether changes to the user data have been received (e.g., from the user). For example, based on the calculated probability, the user may decide to lower his or her minimum retirement income or increase his or her retirement age in order to define a higher probability of achieving the desired retirement income. Alternatively, the user may believe that the calculated probability is relatively high, and may want to aim for a higher desired retirement income or lower retirement age. In one embodiment, the savings driver $102_3$ may further include a tutorial or other educational resources (not shown) to assist the user in determining the likely impact of such changes.

If the method 200 determines in step 208 that changes to the user's personal data have been made, the method 200 proceeds to step 210 and recalculates the probability of the user achieving the desired retirement income. The method 200 then proceeds as described above in step 208 to determine if further changes have been made.

Alternatively, if the method 200 determines in step 208 that no changes have been made to the user's personal data, the method 200 proceeds to step 212 and saves the user's preferences (data).

In step 214, the method 200 generates portfolio allocations (e.g., among fixed income portfolios and growth portfolios, as illustrated in FIG. 1) based on the saved user preferences. For example, the method 200 may determine how to allocate the user's savings among the plurality of portfolios 104, 106, 108, 110 and 112 described with reference to FIG. 1. In one instance, the method 200 may overlay a slight amount of leverage on each fund in a growth portfolio (e.g., growth portfolio 108 of FIG. 1) to increase the probability of achieving the desired retirement income. In addition, the method 200 may lock in the upside as the growth portfolio reaches the desired level (e.g., by selling off the upside and reinvesting it in the fixed income portfolio), in order to maximize the probability of achieving the desired retirement income. Likewise, if the desired retirement income is achievable by being invested one hundred percent in the fixed income portfolio, then this will be how the funds are allocated to lock in the desired retirement income. In one embodiment, the generated portfolio allocations may be provided to a retirement plan administrator for order processing (e.g., where the order may be aggregated with other orders). The method 200 then terminates in step 216.

In one embodiment, the user may already have a history with the retirement income planning system 100 (i.e., the user may have existing balances in the fixed income and growth optimal portfolios 106 and 108, based on previous use of the system 100). In such a case, an abbreviated version of the method 200 may be executed to determine portfolio allocations. One embodiment of this abbreviated method begins by determining whether the present value of the shortfall (S) is less than:

$$FI+(FC)$$

where FI is the current balance in the user's fixed income portfolio and FC is the present value of approximately one hundred percent of the user's future contributions. If the shortfall is less than this amount, then no trading occurs between the fixed income portfolio and the growth optimal portfolio, and the fraction of future contributions that is allocated to the fixed income portfolio is determined according to:

$$\frac{S-FI}{FC}$$

If the user then inputs changes in a way such that the present value of the shortfall is greater than:

$$FI+FC$$

then approximately one hundred percent of future contributions is allocated to the fixed income portfolio. Additionally a transfer is made from the growth optimal portfolio to the fixed income portfolio to account for the difference between the present value of the user's retirement income and (FI+FC).

Figure 4:
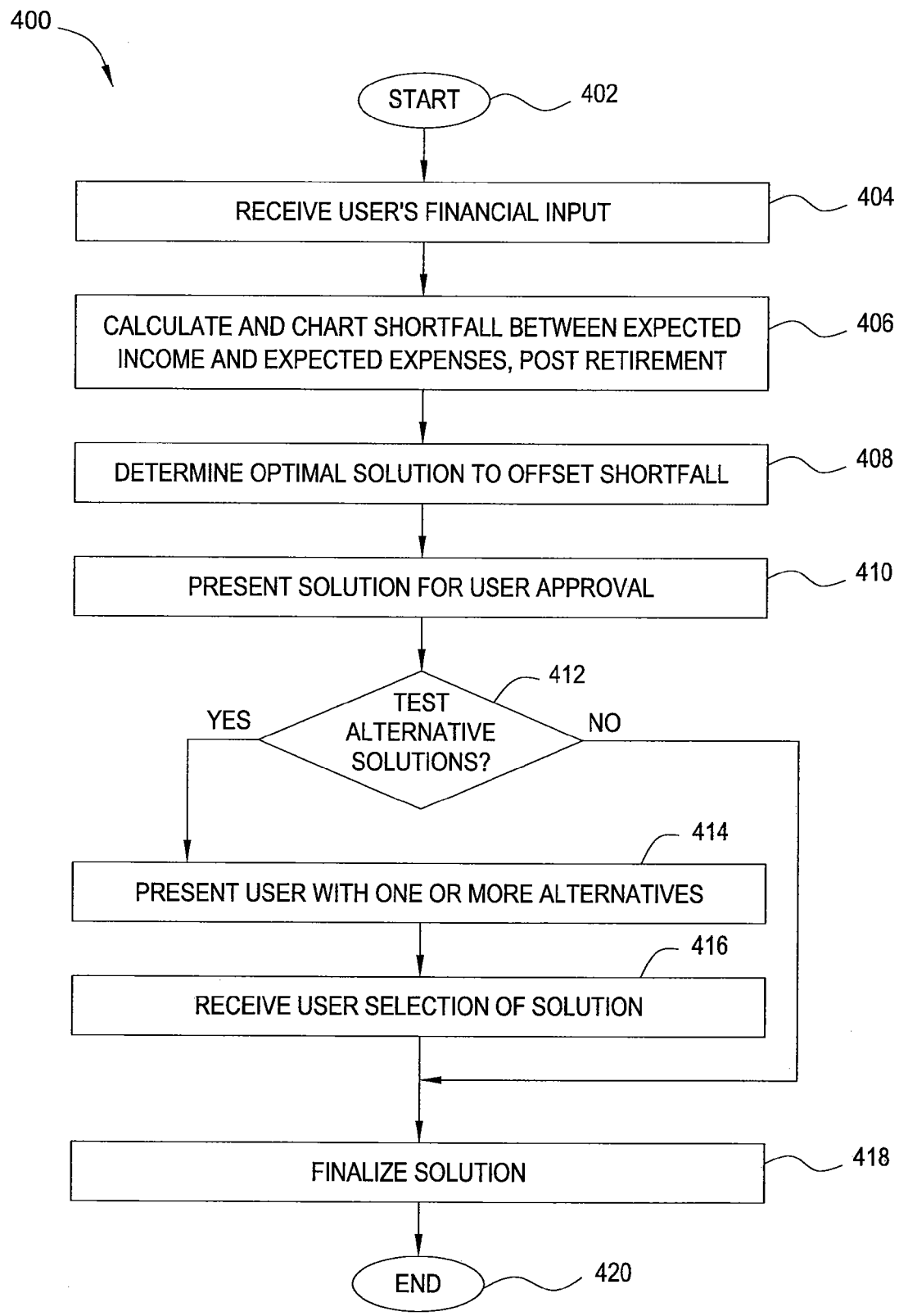
FIG. 4 is a flow diagram illustrating one embodiment of a method for planning a post-retirement income stream based on stated needs or objectives, according to the present invention.

FIG. 4 is a flow diagram illustrating one embodiment of a method 400 for planning a post-retirement income stream based on stated needs or objectives, according to the present invention. The method 400 may be implemented, for example, in the real annuity planner 114 discussed above with respect to FIG. 1.

The method 400 is initialized in step 402 and proceeds to step 404, where the method 400 receives a user's financial input. In one embodiment, this input includes at least one of: the user's expected post-retirement income (e.g., measured monthly, yearly, or by some other unit of time), the user's expected post-retirement expenses (e.g., measured monthly, yearly, or by some other unit of time), the user's current assets (and their values, e.g., including the lump sum acquired during the accumulation phase as described above) and the user's current tax bracket. The user's expected post-retirement income may further include the user's expected pension benefits, estimated social security benefits, estimated investment income and other sources of income.

In step 406, the method 400 calculates and charts the shortfall, or the difference, between the user's expected post-retirement income and the user's expected post-retirement expenses. In one embodiment, the method 400 maps this shortfall on a year-by-year basis, calculating the expected income, expected expenses and computed shortfall for each year of retirement.

In step 408, the method 400 determines an optimal solution, e.g., the best cost of an institutionally priced, inflation-indexed annuity that will offset the calculated shortfall. A method for determining the optimal solution, based on the user's financial input, is described in further detail with respect to FIG. 5. In one embodiment, the annuity is selected from a plurality of institutionally priced annuities provided, for example, by different insurance carriers. In one embodiment, the method 400 selects the annuity that is priced the lowest.

In step 410, the method 400 presents the selected annuity to the user as a proposed solution. The solution illustrates not only the cost of the selected annuity, but also the manner in which the user's income will increase over time to cover anticipated increases in expenses and/or taxes if the selected annuity is purchased.

FIG. 6 illustrates an exemplary display 600 that communicates the optimal solution determined in step 408 to the user. As illustrated, the display 600 illustrates the user's total lifetime income shortfall (e.g., $544,939), the lifetime payout secured by the optimal solution, which is substantially equivalent to the total lifetime income shortfall (e.g., $544,939), the estimated cost of securing the lifetime payout ($284,617), the value of the user's assets (e.g., home equity, personal savings, restricted stock, stock options, etc.) that may be used to purchase the lifetime payout ($400,000), and the surplus or value of the assets that is left over when the lifetime payout is purchased (e.g., $115,383). In one embodiment, the surplus is treated as bonus money. In a further embodiment, the display 600 also provides a fitness score indicative of the user's financial fitness to pursue the optimal solution. Furthermore, the display 600 may provide a visual mapping 602 of the yearly shortfalls and cushions provided by the optimal solution.

Referring back to FIG. 4, in step 412, the method 400 determines (e.g., based on user input or command) whether to test alternative solutions. If the method 400 determines in step 412 that alternative solutions should not be tested, the method 400 proceeds to step 418 and finalizes the selection of the annuity identified in step 408. In one embodiment, finalization of the solution includes purchasing the selected annuity (e.g., via online purchase, print-and-mail, or through a telephone call center). In addition, finalization includes notifying the provider of the selected annuity of the choice and notifying a telephone call center of the choice (so that a call center representative can follow up with the user to confirm the choice). The method 400 then terminates in step 420.

Alternatively, if the method 400 determines in step 412 that alternative solutions should be tested, the method 400 proceeds to step 414 and presents the user with one or more alternate, institutionally priced annuities (e.g., provided by multiple different insurance carriers) that will offset the shortfall calculated in step 406, in addition to the annuity selected in step 408. In one embodiment, these alternate annuities comprise real-time quotes from various insurance carriers. In one embodiment, the cost of each annuity will vary with the insurance carrier providing the annuity.

FIG. 7 illustrates an exemplary display 700 that communicates the alternative solutions to the user. As illustrated, the display 700 may provide a plurality of real-time quotes from various insurance providers indicating the respective costs of the alternative solutions. In this manner, the user can quickly and easily assess the potential solutions and select the one that best suits the user's purposes. The display 700 may include any number of quotes from any number of insurance providers. In one embodiment of the present invention, a display such as that illustrated in FIG. 7, for enabling a user to select an annuity, may be implemented as a stand-alone entity (i.e., not implemented strictly in accordance with the method 400).

Referring back to FIG. 4, in step 416, the method 400 receives a user selection choosing one of the annuities presented in step 414. The method 400 then proceeds to step 418 and progresses as described above to finalize the selection of the annuity identified in step 416.

FIG. 4 illustrates one embodiment of a method for use by a retirement planning tool; however, those skilled in the art will appreciate that alternative methods for selecting annuities may be implemented as well. For example, one can "back into" an annuity selection by first comparing one's expenses to a target post-retirement income, and determining an appropriate annuity in accordance with this information (all the while having the option to reconsider one's expenses and targets, thereby refining the annuity selection).

Figure 5:
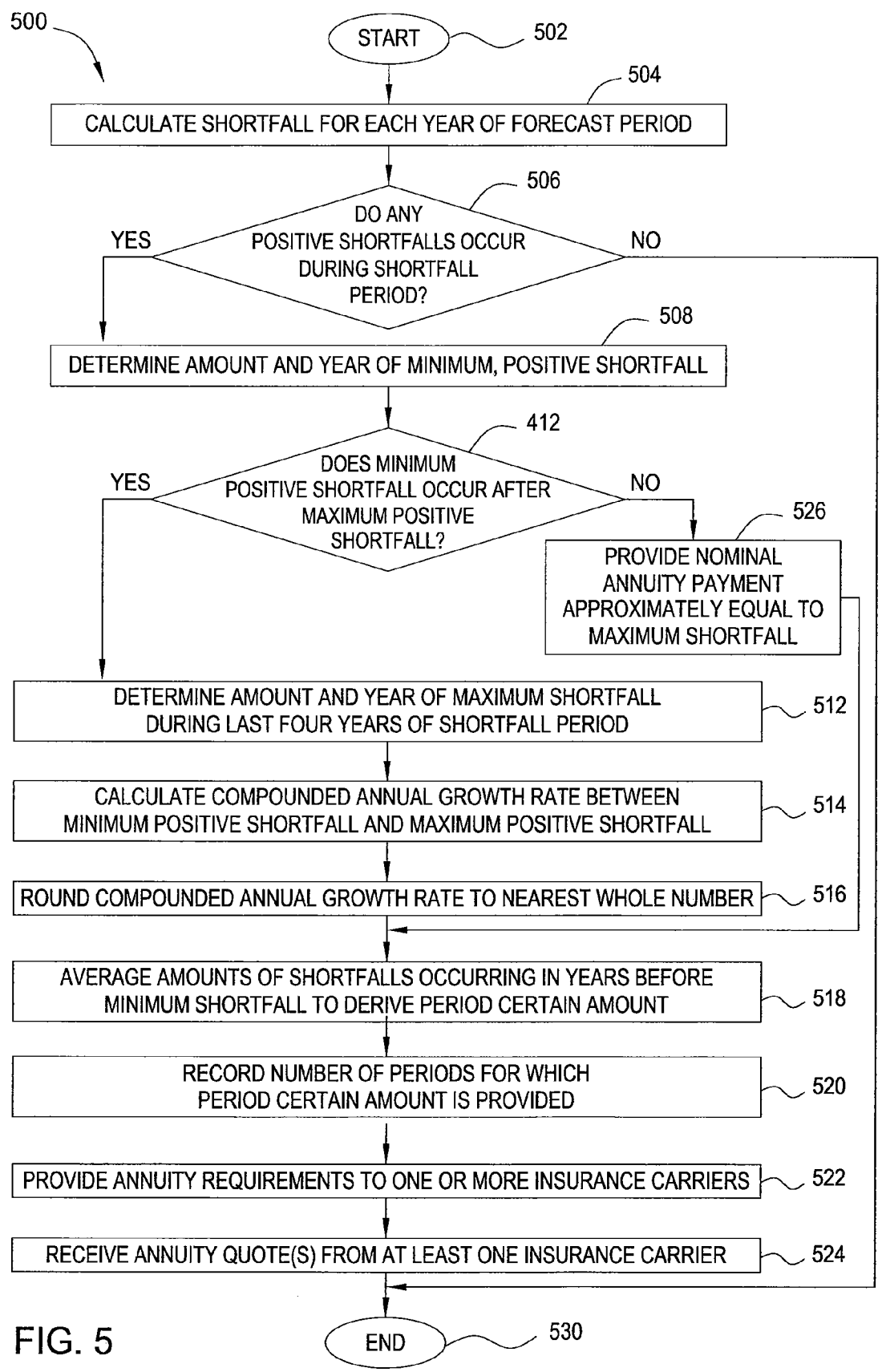
FIG. 5 is a flow diagram illustrating one embodiment of a method for selecting an annuity to offset an anticipated shortfall, according to the present invention.

FIG. 5 is a flow diagram illustrating one embodiment of a method 500 for selecting an annuity to offset an anticipated shortfall (e.g., in accordance with step 408 of the method 400), according to the present invention.

The method 500 is initialized at step 502 and proceeds to step 504, where the method 500 calculates the shortfall, or difference, between the user's expected income and the user's expected expenses, for each year in a forecast period. In one embodiment, the forecast period starts with the later of the current year and the user's expected retirement year. In one embodiment (e.g., where there are joint and/or survivor benefits), the forecast period ends with the later of the user's estimated death (e.g., as estimated using an industry standard mortality table) and the user's spouse's estimated death. In another embodiment (e.g., no joint or survivor benefits), the forecast period ends with the user's estimated death. A second period of time, referred to as the shortfall period, begins with the first year of the forecast period in which a positive shortfall is projected and ends with the end of the forecast period.

In step 506, the method 500 determines whether there are any years in the shortfall period in which a positive shortfall occurs. If the method 500 determines in step 506 that there are no years in the shortfall period in which a positive shortfall occurs, the method 500 terminates in step 524. In such a case, no recommendation concerning annuities can be made (e.g., because there is no gap to fill between income and expenses).

Alternatively, if the method 500 determines in step 506 that there is at least one year in the shortfall period in which a positive shortfall occurs, the method 500 proceeds to step 508 and determines the minimum positive shortfall amount, $S_{min}$, during the shortfall period, and the year, $Y_{min}$, in which the minimum positive shortfall occurs.

In step 510, the method 500 determines whether the minimum positive shortfall amount, $S_{min}$, during the shortfall period occurs after the maximum positive shortfall amount, $S_{max}$, during the shortfall period. If the maximum positive shortfall amount, $S_{max}$, precedes the minimum positive shortfall amount, $S_{min}$, the method 500 proceeds to step 526 and provides for a nominal annuity payment approximately equal to the maximum shortfall amount, $S_{max}$. This nominal annuity payment is to be provided throughout the balance of the user's life. The method 500 then proceeds to step 518 and calculates a period certain amount, as discussed in greater detail below.

Alternatively, if the method 500 determines in step 510 that the minimum positive shortfall amount, $S_{min}$, precedes the maximum positive shortfall amount, $S_{max}$, the method 500 proceeds to step 512 and determines the maximum shortfall amount, $S_{4max}$, during the last four years of the shortfall period, and the year, $Y_{4max}$, in which this maximum shortfall amount, $S_{4max}$, occurs.

In step 514, the method 500 calculates the compounded annual growth rate (CAGR) between the minimum shortfall amount, $S_{min}$, identified in step 508 and the maximum shortfall amount, $S_{4max}$, identified in step 512, accounting for the number of years expiring therebetween according to the following relationship:

$$CAGR = \left(\frac{S_{4max}}{S_{min}}\right)^{\frac{1}{Y_{4max}-Y_{min}}} - 1 \quad (EQN. 1)$$

In step 516, the method 500 rounds the calculated CAGR up or down to the nearest whole number to assist in identifying the corresponding cost of living adjustment (COLA, since insurance carriers typically provide whole number values for COLA). In one embodiment, the flexibility to modify the calculated CAGR is built into the calculation. In one embodiment, the flexibility is built in by capping the CAGR at five percent. If the calculated CAGR exceeds five percent, the maximum shortfall is discounted at five percent to the annuity start year (e.g., in order to determine the starting point of a life-contingent portion of the annuity).

Alternatively, if the calculated CAGR is less than or equal to five percent, the minimum annuity payment (e.g., minimum shortfall amount) is discounted using the CAGR for the years before the start of the life-contingent portion of the annuity (e.g., at the commencement of retirement). For example, if the minimum shortfall amount, $S_{min}$, is determined to be $17,287 in Year 5, $17,287 is divided by 1+CAGR to determine the minimum payment amount for Year 4, by $(1+CAGR)^2$ to determine the minimum payment amount for Year 3, and so on. The Year 1 value of the life-contingent portion of the annuity can be calculated as:

$$\frac{S_{min}}{(1+CAGR)^{Y_{min}-Y_1}} \quad (EQN. 2)$$

where $Y_1$ is the first year of the shortfall period.

Assuming that the CAGR is positive, an upward sloping line should be generated starting at a point below the minimum shortfall amount, $S_{min}$, and matching the minimum shortfall amount, $S_{min}$, in the year, $Y_{min}$, in which the minimum shortfall amount, $S_{min}$, occurs. For example, if the minimum shortfall amount, $S_{min}$, is determined to be $17,287 in Year 5, a starting annuity amount of $15,395 can be expected in Year 1 at a 2.9% CAGR.

However, if the CAGR is negative, the maximum shortfall amount, $S_{max}$, is a nominal amount provided through the balance of the user's life without a graduated increase, as discussed above in connection with step 526.

In one embodiment, the method 500 applies the CAGR to grow the minimum shortfall amount, $S_{min}$, to the maximum shortfall amount, $S_{4max}$, identified in step 512. The method 500 then continues to grow the minimum shortfall amount, $S_{min}$, to the end of the shortfall period (e.g., life expectancy), which is not necessarily the year, $Y_{4max}$, of the maximum shortfall amount, $S_{4max}$, calculated in step 512.

In step 518, the amounts of any shortfalls occurring in years before the minimum shortfall amount, $S_{min}$, is reached (e.g., occurring before $Y_{min}$) are averaged to derive a period certain amount (i.e., an amount that will be paid for a minimum number of years, that is, the years occurring before the minimum shortfall amount). It is assumed in this step that the shortfalls will be larger in the initial years of retirement. Negative shortfall amounts are not included in this calculation. In one embodiment, where three or more consecutive years in the forecast period correspond to shortfall amounts that exceed the income amount provided by the calculated annuity, the method 500 may create a term certain plan for the average difference over the corresponding years. In such a case, the period certain amount is applied starting with the year of the user's retirement. If such spikes occur later in the shortfall period, they are typically smoothed automatically by the calculations described above. The method 500 then records the number of periods for which the period certain amount is provided in step 520.

In step 522, the method 500 delivers the annuity requirements to one or more insurance companies, e.g., to solicit prices for the requisite annuity. In one embodiment, the information provided to solicit the annuity prices includes the calculated life-contingent amount (e.g., at the commencement of retirement), the CAGR (e.g., equivalent to a cost of living allowance or graduated payment), the calculated period certain amount and the number of years for which the period certain amount is applied.

In step 524, the method 500 receives, in real time (e.g., substantially instantaneously) an annuity quote from at least one of the insurance companies contacted in step 522. The method 500 may then assess the received quote(s) to determine the optimal solution (e.g., the annuity that provides the desired income stream at the lowest price), as described above with respect to FIG. 2.

The method 500 then terminates in step 530.

In one embodiment, the method 500 may additionally apply a fitness test wherein the difference between the cumulative shortfall (e.g., over all years of the forecast period) and the income provided by the calculated annuity is determined. If the difference is greater than ten percent over the forecast period, the user may be directed to a customer service representative.

Figure 8:
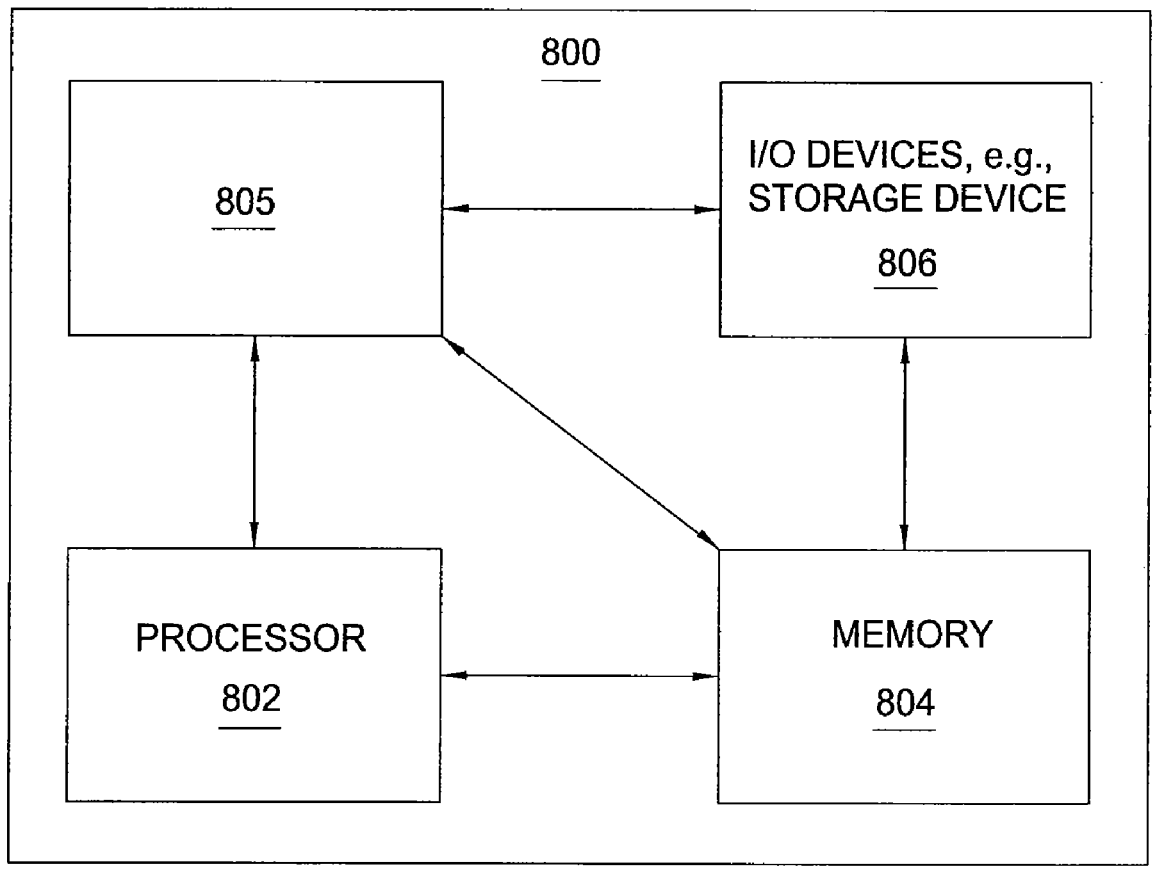
FIG. 8 is a high level block diagram of the present retirement planning tool that is implemented using a general purpose computing device.

FIG. 8 is a high level block diagram of the present retirement planning tool that is implemented using a general purpose computing device 800. In one embodiment, a general purpose computing device 800 comprises a processor 802, a memory 804, a retirement planning module 805 and various input/output (I/O) devices 806 such as a display, a keyboard, a mouse, a modem, a network connection and the like. In one embodiment, at least one I/O device is a storage device (e.g., a disk drive, an optical disk drive, a floppy disk drive). It should be understood that the retirement planning module

805 can be implemented as a physical device or subsystem that is coupled to a processor through a communication channel.

Alternatively, the retirement planning module 805 can be represented by one or more software applications (or even a combination of software and hardware, e.g., using Application Specific Integrated Circuits (ASIC)), where the software is loaded from a storage medium (e.g., I/O devices 806) and operated by the processor 802 in the memory 804 of the general purpose computing device 800. Additionally, the software may run in a distributed or partitioned fashion on two or more computing devices similar to the general purpose computing device 800. Thus, in one embodiment, the retirement planning module 805 for planning an income stream for retirement described herein with reference to the preceding figures can be stored on a computer readable medium or carrier (e.g., RAM, magnetic or optical drive or diskette, and the like).

Thus, the present invention represents a significant advancement in the field of retirement planning. In particular, the present invention integrates a plurality of financial drivers in order to assist an individual in managing his or her assets and targeted needs (e.g., income, savings, home, medical, etc.) to ensure a desired standard of living, both while working and while retired. In one embodiment, assets and risks are managed in a manner that provides an income stream upon retirement, the income stream providing the financial means to support the desired standard of living.

While the foregoing is directed to embodiments of the invention, other and further embodiments of the invention may be devised without departing from the basic scope thereof.

What is claimed is:

1. A method for planning an income stream, the method comprising:
    receiving personal data relating to an individual, the personal data including a value of a projected total future income of the individual and a value of projected total future expenses of the individual;
    electronically calculating on a computer an estimated difference between the projected total future expenses and the projected total future income on a year-by-year basis for a defined period of time, the estimated difference being calculated before the estimated difference actually occurs, wherein the calculating comprises:
        identifying a first year, the first year being a year within the defined period of time within which a positive difference between the projected total future expenses and the projected total future income is first expected to occur;
        designating a period of time between the first year and a final year of the defined period of time as a shortfall period, the final year being estimated based on a life expectancy of the individual; and
        determining a sum of money required to offset the difference between the projected total future expenses and the projected total future income during the shortfall period;
    outputting the sum of money to one or more annuity providers;
    receiving a plurality of annuity quotes from at least one of the one or more annuity providers, the plurality of annuity quotes being presented in an auction-style format; and
    purchasing an annuity from among the plurality of annuity quotes, the annuity providing a sum to offset the estimated difference.

2. The method of claim 1, wherein the personal data further includes at least one of: one or more assets currently possessed by the individual and a pre-retirement tax bracket currently applied to the individual.

3. The method of claim 1, wherein the personal data is supplied by at least one of: the individual or an employer of the individual.

4. The method of claim 1, wherein the projected total future income and the projected total future expenses relate to a planned retirement period.

5. The method of claim 1, wherein the defined period of time begins on the later of: a current year and a projected retirement year of the individual, and the defined period of time ends on the later of: an estimated year of death for the individual and an estimated year of death for a spouse of the individual.

6. The method of claim 1, wherein the determining comprises:
    identifying a minimum positive difference expected to occur during the shortfall period;
    identifying a year in which the minimum positive difference is expected to occur;
    identifying a maximum positive difference expected to occur during the shortfall period;
    identifying a year in which the maximum positive difference is expected to occur; and determining whether the year in which the minimum positive difference is expected to occur occurs after the year in which the maximum positive difference is expected to occur.

7. The method of claim 6, further comprising:
    soliciting a nominal annuity payment approximately equal to the maximum positive difference, if the year in which the minimum positive difference is expected to occur occurs before the year in which the maximum positive difference is expected to occur; and
    soliciting an augmented annuity payment greater than the maximum positive difference, if the year in which the minimum positive difference is expected to occur occurs after the year in which the maximum positive difference is expected to occur.

8. The method of claim 7, wherein an amount of the augmented annuity payment is determined by:
    identifying a maximum difference during a final four years of the shortfall period; and
    calculating a compounded annual growth rate between the minimum positive difference and the maximum difference during the final four years of the shortfall period; and
    calculating an amount of a cost of living adjustment to supplement the nominal annuity payment, in accordance with the compounded annual growth rate.

9. The method of claim 7, further comprising:
    calculating a period certain amount to be paid at least during one or more years occurring before the year in which the minimum positive difference is expected to occur; and
    recording the one or more years in which the period certain amount is to be paid.

10. The method of claim 9, wherein calculating the period certain amount comprises:
    identifying all positive differences expected to occur in the years before the year in which the minimum positive difference is expected to occur; and
    computing an average of the identified positive differences.

11. The method of claim 1, wherein the purchasing comprises:

delivering to one or more insurance carriers requirements for the annuity;

receiving in substantially real time from the insurance carriers one or more quotes, each of the one or more quotes comprising a cost of an annuity provided by an associated insurance carrier that fulfills the requirements; and selecting the annuity from among the one or more quotes.

12. The method of claim 11, wherein the selecting comprises:

selecting an annuity based on at least one of: a cost of the annuity, a credit rating of the individual, an insurance carrier providing the annuity, a location of an insurance carrier providing the annuity or a size of an insurance carrier providing the annuity.

13. The method of claim 11, wherein the selecting comprises:

receiving an instruction to purchase an annuity selected by the individual.

14. The method of claim 1, wherein the auction-style format is conducted online.

15. The method of claim 1, wherein each of the plurality of annuities is at least one of: institutionally priced and inflation-indexed.

16. A computer readable medium containing an executable program for planning an income stream, where the program performs the steps of:

receiving personal data relating to an individual, the personal data including a value of a projected total future income of the individual and a value of projected total future expenses of the individual;

calculating an estimated difference between the projected total future expenses and the projected total future income on a year-by-year basis for a defined period of time, the estimated difference being calculated before the estimated difference actually occurs, wherein the calculating comprises:

identifying a first year, the first year being a year within the defined period of time within which a positive difference between the projected total future expenses and the projected total future income is first expected to occur;

designating a period of time between the first year and a final year of the defined period of time as a shortfall period, the final year being estimated based on a life expectancy of the individual; and determining a sum of money required to offset the difference between the projected total future expenses and the projected total future income during the shortfall period;

outputting the sum of money to one or more annuity providers;

receiving a plurality of annuity quotes from at least one of the one or more annuity providers, the plurality of annuity quotes being presented in an auction-style format; and purchasing an annuity from among the plurality of annuity quotes, the annuity providing a sum to offset the estimated difference.

17. The computer readable medium of claim 16, wherein the personal data further includes at least one of: one or more assets currently possessed by the individual and a pre-retirement tax bracket currently applied to the individual.

18. The computer readable medium of claim 16, wherein the personal data is supplied by at least one of: the individual or an employer of the individual.

19. The computer readable medium of claim 16, wherein the projected total future income and the projected total future expenses relate to a planned retirement period.

20. The computer readable medium of claim 16, wherein the defined period of time begins on the later of: a current year and a projected retirement year of the individual, and the defined period of time ends on the later of: an estimated year of death for the individual and an estimated year of death for a spouse of the individual.

21. The computer readable medium of claim 16, wherein the determining comprises:

identifying a minimum positive difference expected to occur during the shortfall period;

identifying a year in which the minimum positive difference is expected to occur;

identifying a maximum positive difference expected to occur during the shortfall period;

identifying a year in which the maximum positive difference is expected to occur; and determining whether the year in which the minimum positive difference is expected to occur occurs after the year in which the maximum positive difference is expected to occur.

22. The computer readable medium of claim 21, further comprising:

soliciting a nominal annuity payment approximately equal to the maximum positive difference, if the year in which the minimum positive difference is expected to occur occurs before the year in which the maximum positive difference is expected to occur; and soliciting an augmented annuity payment greater than the maximum positive difference, if the year in which the minimum positive difference is expected to occur occurs after the year in which the maximum positive difference is expected to occur.

23. The computer readable medium of claim 22, wherein an amount of the augmented annuity payment is determined by:

identifying a maximum difference during a final four years of the shortfall period; and calculating a compounded annual growth rate between the minimum positive difference and the maximum difference during the final four years of the shortfall period; and calculating an amount of a cost of living adjustment to supplement the nominal annuity payment, in accordance with the compounded annual growth rate.

24. The computer readable medium of claim 22, further comprising:

calculating a period certain amount to be paid at least during one or more years occurring before the year in which the minimum positive difference is expected to occur; and recording the one or more years in which the period certain amount is to be paid.

25. The computer readable medium of claim 24, wherein calculating the period certain amount comprises:

identifying all positive differences expected to occur in years before the year in which the minimum positive difference is expected to occur; and computing an average of the identified positive differences.

26. The computer readable medium of claim 16, wherein the purchasing comprises:

delivering to one or more insurance carriers requirements for the annuity;

receiving in substantially real time from the insurance carriers one or more quotes, each of the one or more quotes comprising a cost of an annuity provided by an associated insurance carrier that fulfills the requirements; and selecting the annuity from among the one or more quotes.

27. The computer readable medium of claim 26, wherein the selecting comprises:

selecting an annuity based on at least one of: a cost of the annuity, a credit rating of the individual, an insurance carrier providing the annuity, a location of an insurance carrier providing the annuity or a size of an insurance carrier providing the annuity.

28. The computer readable medium of claim 26, wherein the selecting comprises:

receiving an instruction to purchase an annuity selected by the individual.

29. The computer readable medium of claim 16, wherein the auction-style format is conducted online.

30. The computer readable medium of claim 16, wherein each of the plurality of annuities is at least one of: institutionally priced and inflation-indexed.

31. A system for planning an income stream, the system comprising:

means for receiving personal data relating to an individual, the personal data including a value of a projected total future income of the individual and a value of projected total future expenses of the individual;

means for calculating an estimated difference between the projected total future expenses and the projected total future income on a year-by-year basis for a defined period of time, the estimated difference being calculated before the estimated difference actually occurs, wherein the calculating comprises:

means for identifying a first year, the first year being a year within the defined period of time within which a positive difference between the projected total future expenses and the projected total future income is first expected to occur;

means for designating a period of time between the first year and a final year of the defined period of time as a shortfall period, the final year being estimated based on a life expectancy of the individual; and means for determining a sum of money required to offset the difference between the projected total future expenses and the projected total future income during the shortfall period;

means for outputting the sum of money to one or more annuity providers;

means for receiving a plurality of annuity quotes from at least one of the one or more annuity providers, the plurality of annuity quotes being presented in an auction-style format; and means for purchasing an annuity from among the plurality of annuity quotes, the annuity providing a sum to offset the estimated difference.

\* \* \* \* \*

UNITED STATES PATENT AND TRADEMARK OFFICE
CERTIFICATE OF CORRECTION

| | | |
|---|---|---|
| PATENT NO. | : 7,647,261 B2 | Page 1 of 1 |
| APPLICATION NO. | : 11/531989 | |
| DATED | : January 12, 2010 | |
| INVENTOR(S) | : Merton et al. | |

It is certified that error appears in the above-identified patent and that said Letters Patent is hereby corrected as shown below:

Title Page, item (56), Col. 2 (U.S. Patents Documents) Line 2: Delete "8,424,952" and insert -- 6,424,952 --, therefor.

In the Claims

Col. 12, Lines 17-29: Delete "6. The method of Claim 1, wherein the determining comprises:
    identifying a minimum positive difference expected to occur during the
        shortfall period;
    identifying a year in which the minimum positive difference expected to
        occur;
    identifying a maximum positive difference expected to occur during the
        shortfall period;
    identifying a year in which the maximum positive difference is expected to
        occur; and determining whether the year in which the minimum positive
        difference is expected to occur occurs after the year in which the
        maximum positive difference is expected to occur."
and insert -- 6. The method of Claim 1, wherein the determining comprises:
    identifying a minimum positive difference expected to occur during the
        shortfall period;
    identifying a year in which the minimum positive difference expected to
        occur;
    identifying a maximum positive difference expected to occur during the
        shortfall period;
    identifying a year in which the maximum positive difference is expected to
        occur; and
    determining whether the year in which the minimum positive difference is
        expected to occur occurs after the year in which the maximum positive
        difference is expected to occur. --, therefor.

Signed and Sealed this
Sixth Day of May, 2014

Michelle K. Lee
*Deputy Director of the United States Patent and Trademark Office*